United States Patent [19]

Nakae

[11] 4,290,469
[45] Sep. 22, 1981

[54] SELF-LOCKING NUT-TYPE OR BOLT-TYPE FASTENING DEVICE

[75] Inventor: Isoji Nakae, Wakayama, Japan

[73] Assignee: Kishu Neji Co., Ltd., Osaka, Japan

[21] Appl. No.: 72,047

[22] Filed: Sep. 4, 1979

[51] Int. Cl.³ ............................................ F16B 39/282
[52] U.S. Cl. ..................................... 411/185; 411/188
[58] Field of Search ........................ 151/37, 35, 40, 39

[56] References Cited
U.S. PATENT DOCUMENTS 3,078,899  2/1963  MacLean et al. ...................... 151/37
3,752,203  8/1973  Hill, Jr. .................................. 151/37

Primary Examiner—Ramon S. Britts
Attorney, Agent, or Firm—Wenderoth, Lind & Ponack

[57] ABSTRACT

A fastening device includes a body having an engaging surface and threads concentric with the rotational axis of the body. The engaging surface has formed therein a plurality of ratchet-like projections having a sawtooth-type circumferential cross-section. Each projection includes a first radially outer edge and a second radially inner edge which together define a leading point which forms a most prominent portion of the projection. All of the points are located on an imaginary circular line and facing in the direction of loosening of the fastening device. Each first edge extends outwardly from the circular line in a direction inclined to the radial, and each second edge extends inwardly from the circular line in a direction inclined to the radial. The circular line is positioned nearer the inner periphery of the engaging surface than the outer periphery thereof.

6 Claims, 9 Drawing Figures

SELF-LOCKING NUT-TYPE OR BOLT-TYPE FASTENING DEVICE

BACKGROUND AND SUMMARY OF THE INVENTION

The present invention relates to an improved self-locking fastening device having toothed engaging surfaces, and more particularly to improved fastening devices of the type including bolts, nuts and the like having lower engaging surface projections with teeth constructed to afford resistance to loosening of the fastening device, after being brought into pressure engagement with an adjacent surface of a workpiece by the tightening of the fastening device.

An object of the present invention is to provide an improved self-locking fastening device of the nut-type or bolt-type having a toothed engaging surface such that the torque required to loosen the fastening device greatly exceeds the torque required for tightening the fastening device.

Another object of the present invention is to provide such an improved fastening device with an engaging surface having ratchet-like projections in the form of double edges, whereby when the fastening device is turned in a loosening direction an adjacent workpiece surface is cut by the projections and engaged with the latter without abrasion or injury of the points of the projections, thereby obtaining a locking action by the fastening device.

Still another object of the present invention is to provide an integrally formed threaded fastening device having an engaging surface provided with a number of ratchet-like projections to cause, on an adjacent workpiece, two groups of engaging sections divided inwardly and outwardly so as to provide a strong locking action when the fastening device is rotated in a loosening direction.

Still another object of the present invention is to provide a unique construction of the toothed engaging surface of the fastening device to provide higher release torque to application torque ratio characteristics than generally known lock nut or bolt type devices.

BRIEF DESCRIPTION OF THE DRAWINGS

Other objects and advantages of the present invention will become apparent from the following detailed description, with reference to the accompanying drawings, wherein:

FIG. 7 illustrates an adaptation of a standard nut, FIG. 8 illustrates an adaptation of a bolt having a flanged head, and FIG. 9 illustrates an adaptation of a standard bolt having a head.

DETAILED DESCRIPTION OF THE INVENTION

Figure 1:
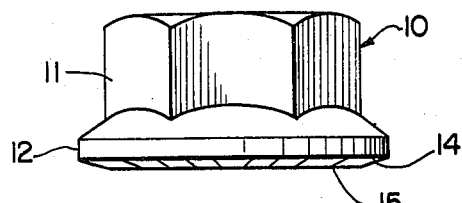
FIG. 1 is a side view showing the adaptation of an embodiment of the invention to a flanged nut.

Referring to the drawings in more detail, like reference numerals have been employed to denote similar parts in the various figures.

In FIG. 1, there is shown one embodiment of the present invention in the form of a threaded flange nut 10.

The nut 10 includes a body 11 having an annular flange 12 formed at the lower portion of the body, a threaded bore 13 extending through the axis of the body, and an engaging end surface 14 having therein a number of ratchet-like projections 15.

Each of the projections 15 includes a first inclined side edge 17 and a second inclined side edge 18 which together form a leading point 19 which is formed at the most prominent area of the projection. All of the points 19 are formed on an imaginary circular line 16 and are arranged to face in the direction of loosening of the nut 10.

First edges 17 extend in directions outwardly from the circular line 16 and second edges 18 extend in directions inwardly from the circular line. The circular line 16 is positioned nearer to the inner periphery 20 of the engaging surface than the outer periphery thereof so that lengths of first edges 17 are greater than lengths of second edges 18, by several times, preferably by a five-to-one ratio.

Figure 5:
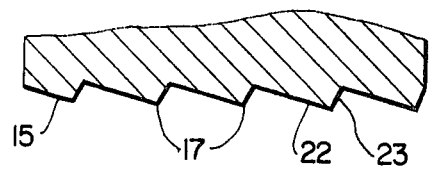
FIG. 5 is a fragmentary sectional view taken along line V—V in FIG. 2.

The first and second edges 17 and 18 are all inclined to the radial, but in different directions therefrom, and define an angle X of from 65° to 90°, preferably 72°, to form sharp points 19. Also, as shown in FIG. 5, edges 17 and 18 are defined by slightly inclined surfaces 22 and steeply inclined surfaces 23 which extend in substantially right angular relationship.

Figure 4:
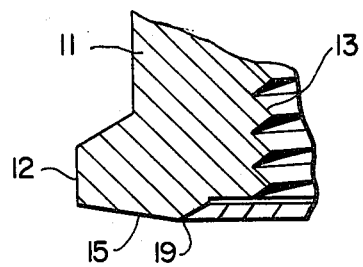
FIG. 4 is a fragmentary sectional view taken along line IV—IV in FIG. 2.
Figure 2:
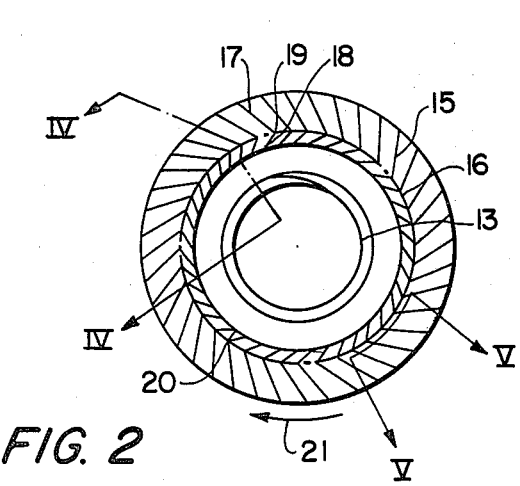
FIG. 2 is an end view of the flanged nut illustrated in FIG. 1.

Thus, points 19 extend circumferentially, as shown in FIG. 2, and axially or longitdinally, as shown in FIG. 4.

Figure 6:
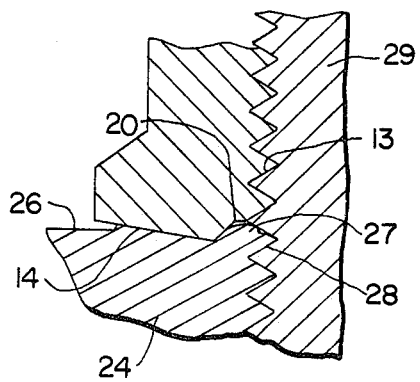
FIG. 6 is a sectional view of another somewhat modified embodiment which shows the relative position occupied by the projections and the workpiece when the nut is rotated in a loosening direction.

In operation, it will be understood that the points 19 of the projections on the engaging surface 14 serve as spearheads when the nut is turned in the loosening direction as shown by arrow 21 in FIG. 2, thereby cutting into the surface of an adjacent workpiece 24, as shown in FIG. 6. The points easily bite into the adjacent workpiece 24 by effect of the double edges 17 and 18 of the projections 15 forming the leading points 19, thereby preventing abrasion or injury to the pointed projections.

Figure 3:
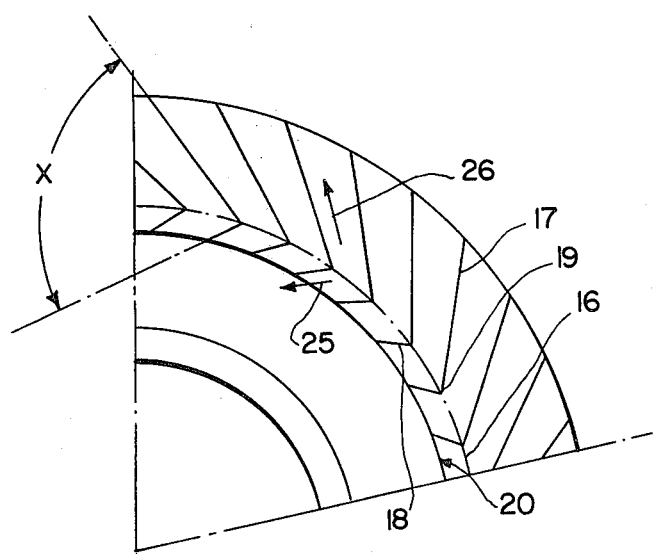
FIG. 3 is a fragmentary enlarged end view of the flanged nut.

Furthermore, the material cut from the workpiece by the projections is divided in two directions along the first and the second side edges 17 and 18, as shown by arrows 26 and 25, respectively, in FIG. 3. Since the cutting area of the first side edges 17 is larger, e.g. five times as large, than that of the second side edges 18, a larger quantity of cut material is generated by the first side edges 17 and serves as resistance material. In general, the coefficient of friction of the outer portion of the engaging surface 14 is larger than that of the inner portion of the engaging surface. Thus, the aforementioned large resistance material generated by the first edges 17 provides a large amount of locking resistance and effectively acts to prevent loosening of the nut.

In addition, each of the projections 15 is compressed from opposite directions by the outer cut material and the inner cut material, so as to cause a wedging effect on the projections, thereby increasing the locking action of the nut. If, as shown in FIG. 6, the inner periphery 20 of the engaging surface 14 is arranged near the threaded bore 13, the inner cut material 27 generated by the second edges 18 is compressed between the projections and threads 28 of bolt 29 extending through the nut and provides large resistance to rotation in the loosening direction, thereby obtaining a high degree of locking action of the fastening device.

Figure 7:
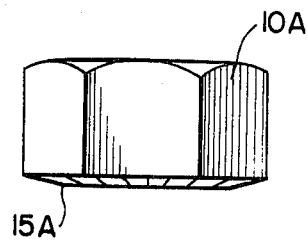
FIGS. 7, 8 and 9 are side views of other embodiments of the present invention, where

Referring to FIG. 7, the present invention is shown as adapted to a standard nut 10A in which projections 15A having the same construction as projections 15 in the first embodiment are provided to achieve the same locking action described above regarding the first embodiment.

Figure 8:
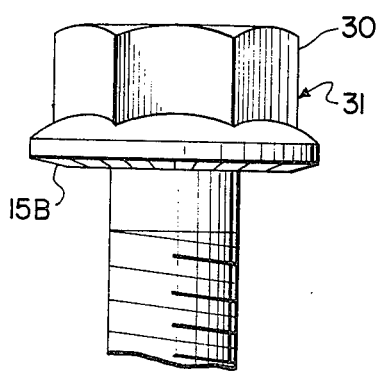
Figure 9:
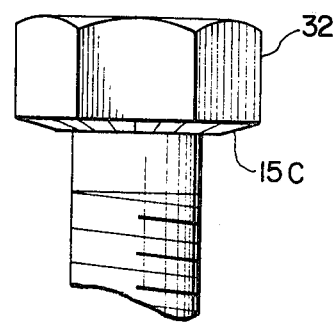

FIGS. 8 and 9 also illustrate other embodiments of the present invention in which projections 15B similar to the aforementioned projections 15 of the first embodiment are formed on the lower surface of a flanged head 30 of the bolt 31 in FIG. 8, and projections 15C similar to projections 15 are adapted to a standard headed bolt 32 in FIG. 9. It will be understood that the bolts illustrated in FIGS. 8 and 9 also will provide the same locking action as described above regarding the aformentioned first embodiment.

Various changes and modifications may be made to the above described specific embodiments, as will accur to those skilled in the art, without departing from the scope of the present invention.

What I claim is:

1. A fastening device comprising:
 a body having a rotational axis, an engaging surface and threads concentric with said axis;
 said engaging surface having formed therein and extending therefrom a plurality of ratchet-like projections having a sawtooth-type circumferential cross-section;
 each said projection including a first radially outer edge and a second radially inner edge which together define a leading point which forms a most prominent portion of said projection;
 all of said points being located on an imaginary circular line and facing in the direction of loosening of the fastening device;
 each said first edge extending outwardly from said circular line in a direction inclined to the radial by a first angle;
 each said second edge extending inwardly from said circular line in a direction inclined to the radial by a second angle different from said first angle; and
 said circular line being positioned nearer the inner periphery of said engaging surface than the outer periphery thereof, whereby the cutting area of said first edges is larger than that of said second edges, and the length of each said first edge is greater than the length of each said second edge.

2. A fastening device as claimed in claim 1, wherein said first edge and said second edge of each said projection extend to each other at an angle of from 65° to 90°, and each said ratchet-like projection is formed by surfaces which intersect, in circumferential cross-section, at substantially a right angle, whereby said points are relatively sharp.

3. A fastening device as claimed in claims 1 or 2, wherein said engaging surface having said projections is formed on a bottom surface of a flanged nut.

4. A fastening device as claimed in claims 1 or 2, wherein said engaging surface having said projections is formed on a bottom surface of a standard nut.

5. A fastening device as claimed in claims 1 or 2, wherein said engaging surface having said projections is formed on the bottom surface of a flanged head of a flanged head bolt.

6. A fastening device as claimed in claims 1 or 2, wherein said engaging surface having said projections is formed on a bottom surface of a head of a standard headed bolt.

* * * * *